(12) United States Patent
Lineton

(10) Patent No.: US 6,921,088 B2
(45) Date of Patent: Jul. 26, 2005

(54) PTFE SEAL AND METHOD OF FABRICATION

(75) Inventor: Warran B. Lineton, Plymouth, MI (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 0 days.

(21) Appl. No.: 10/668,935

(22) Filed: Sep. 23, 2003

(65) Prior Publication Data

US 2004/0056430 A1 Mar. 25, 2004

Related U.S. Application Data

(62) Division of application No. 10/223,206, filed on Aug. 19, 2002, now Pat. No. 6,676,880.

(51) Int. Cl.[7] ............................................... F16J 15/46
(52) U.S. Cl. ...................................... 277/628; 277/549
(58) Field of Search ................................ 277/628, 549

(56) References Cited

U.S. PATENT DOCUMENTS

| | | | |
|---|---|---|---|
| 3,182,108 A | 5/1965 | Branscum | |
| 3,520,963 A | 7/1970 | Allseits et al. | |
| 3,556,161 A | 1/1971 | Roberts | |
| 3,857,156 A | 12/1974 | Clark | |
| 4,209,476 A | 6/1980 | Harris | |
| 4,225,547 A | 9/1980 | Okita | |
| 4,243,235 A | 1/1981 | Repella | |
| 4,497,496 A | 2/1985 | Repella | |
| 4,542,573 A | 9/1985 | Bainard | |
| 4,663,107 A | 5/1987 | Takada et al. | |
| 5,312,573 A | 5/1994 | Rosenbaum et al. | |
| 5,318,650 A | 6/1994 | Kerawalla | |
| 5,458,838 A | 10/1995 | Okumura et al. | |
| 5,725,814 A | 3/1998 | Harris | |
| 5,861,117 A | 1/1999 | Rosenbaum | |
| 5,882,012 A * | 3/1999 | Niwa et al. | 277/407 |
| 5,955,016 A | 9/1999 | Goldfarb | |
| 6,109,934 A | 8/2000 | Madsen et al. | |
| 2003/0098549 A1 * | 5/2003 | Mellet et al. | 277/559 |

* cited by examiner

*Primary Examiner*—Enoch Peavey
(74) *Attorney, Agent, or Firm*—Howard & Howard

(57) ABSTRACT

A PTFE seal and method of fabrication therefor includes preparing a mixture of PTFE resin powder and a susceptor material which is then compacted and sintered by exciting the susceptor material with microwave energy. Preferably, the compaction and sintering of the mixture is carried out in a continuous process and a vacuum is drawn on the mixture in the heating zone to extract any air from the mixture. The sintered mixture is advanced, preferably continuously, to a cutting zone where PTFE wafers are cut from the sintered mixture, preferably while the mixture is still warm.

3 Claims, 2 Drawing Sheets

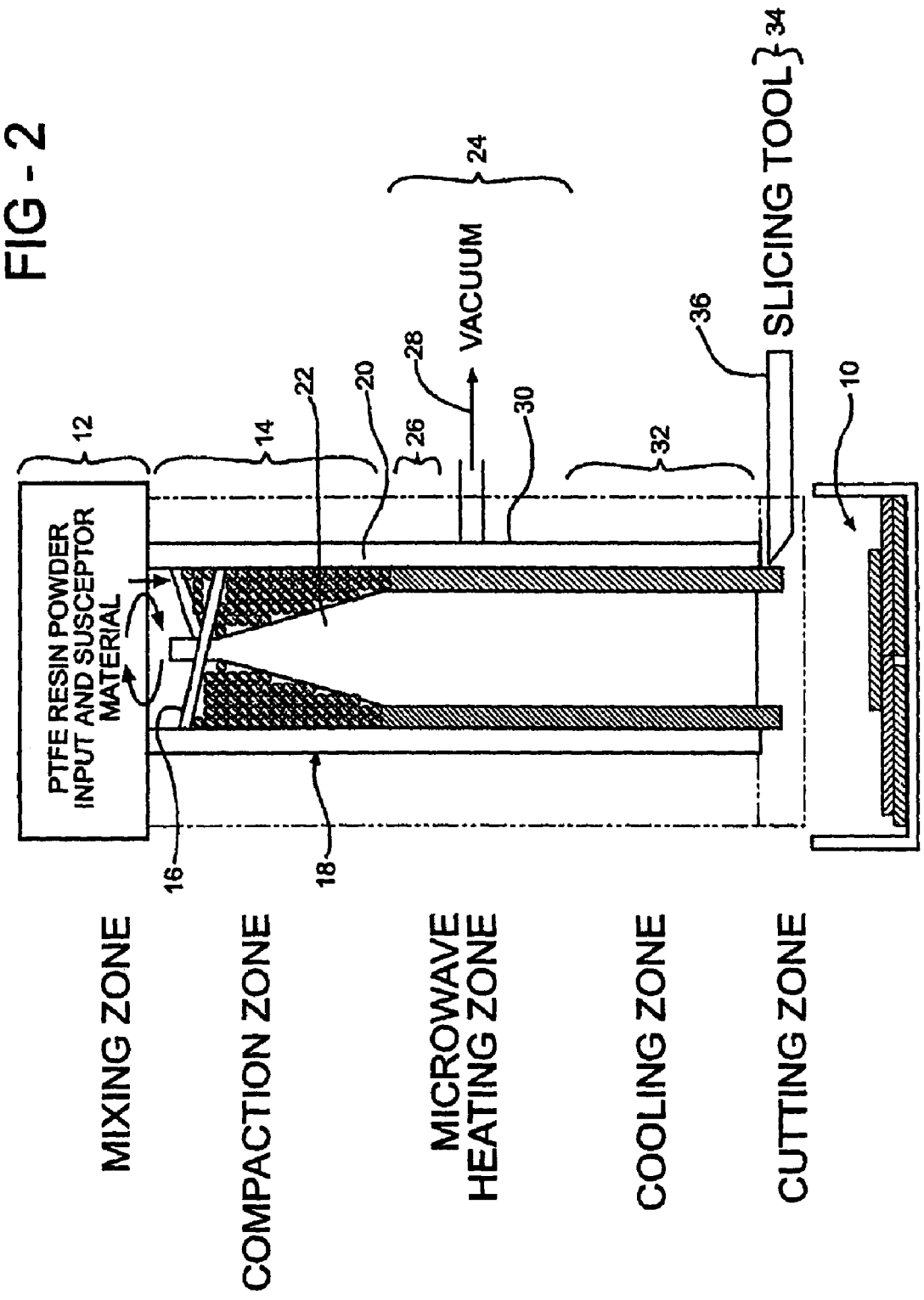

PTFE SEAL AND METHOD OF FABRICATION

This application is a division of U.S. application Ser. No. 10/223,206, filed Aug. 19, 2002 now U.S. Pat. No. 6,676,880.

BACKGROUND OF THE INVENTION

1. Field of the Invention

The invention relates generally to polytetraflouroethylene (PTFE) seals for use in dynamic shaft seal applications and the like where a PTFE wafer is used as a seal component and a method of fabrication therefor.

2. Related Art

The art of producing effective seals between a rotating member and a stationary member is under continual development. It is well know that seals acting between a rotating member and a stationary member often comprise a PTFE component in combination with an elastomer component. The manufacture of the PTFE seal component is typically the bottleneck in the process of producing a seal. PTFE is difficult to form to a desired shape due to its inherent heat resistant characteristics, and thus, poor conductivity. This makes PTFE difficult to mold, thus complicating the manufacture process of making components parts from PTFE.

Typically, PTFE is formed to the desired component geometry by exposing PTFE resin powder to melting temperatures, in the desired mold geometry, for an extended period of time. The amount of time required to process the PTFE resin powder from a "green" state to a cured or sintered state can take anywhere between 2 to 10 hours or more, depending on the geometry sought. This amount of time investment to produce a component for a seal is highly cost inefficient from the standpoint of labor, energy consumption, and space consumption in a furnace, among other associated costs. Additionally, the interruption of the manufacture process to produce a seal by having to spend so much time in a single operation, i.e. sintering of the PTFE seal element, prevents manufacturing efficiencies otherwise possible by utilizing a continuous manufacturing process.

Therefore, being as many seals in production today utilize a PTFE component for its lubricious properties, it would be highly advantageous to have a process for construction a PTFE seal component in an efficient manner. A method of constructing a PTFE seal component according to the current invention as described hereafter in a currently preferred embodiment of the invention overcomes or greatly minimizes the limitations of prior methods of forming a seal component manufactured from PTFE.

SUMMARY OF THE INVENTION

A method of constructing a PTFE seal component is provided that enables construction of the component in a quick and relatively cost efficient manner. The seal component construction begins by creating a mixture of PTFE resin powder and a susceptor material. The mixture is then routed to a compacting zone wherein the mixture is compacted to a specific geometry. Upon being compacted, the mixture is then sintered by exciting the susceptor material to generate heat uniformly throughout the mixture. Thereafter, the sintered material is routed to a cutting tool wherein a desired thickness of seal component is cut from the sintered mixture.

Another currently preferred embodiment of the invention employs a continuous method of constructing a seal component comprised of PTFE resin powder and a susceptor material. Upon creating the mixture, the mixture is routed to a compaction zone to a least partially compact the mixture. A continuous flow of the mixture is then routed from the compaction zone to a heating zone wherein the mixture is sintered by exciting the susceptor material within the mixture to create a billet of PTFE seal material. From the heating zone, the billet flows continuously to a cutting zone where a cutting tool is used to cut the seal component of a desired thickness from the billet.

One advantage of the current invention is that a PTFE seal component can be constructed in a relatively short period of time.

Another advantage of the invention is that the costs associated with the production of a PTFE seal component is reduced.

Another advantage of the invention is that a PTFE seal component can be constructed in a continuous process.

Another advantage of the invention is that a PTFE seal component can be constructed such that the material of the seal component is relatively uniform in strength.

Another advantage of the invention is that a PTFE seal component can be cut to a desired thickness in a reliable and repeatable manner.

Another advantage of the invention is that PTFE resin powder may be compacted to a more uniform density, thus producing a more uniform PTFE seal component.

Another advantage of the invention is that a PTFE seal component may be constructed in a relatively easy manner, thereby reducing the amount of time and associated costs in constructing the PTFE seal component.

The above list of advantages for the method of construction of a PTFE seal component embodying the current invention is meant to represent only a partial listing of advantages, and in no way is to be construed and a complete list of advantages of the current invention.

BRIEF DESCRIPTION OF THE DRAWINGS

These and other features, advantages, and benefits of the invention will become more readily appreciated when considered in connection with the following detailed description and appended drawings, wherein:

FIG. 2 shows a pictorial representation of the schematic diagram from FIG. 1.

DETAILED DESCRIPTION OF THE PREFERRED EMBODIMENTS

Figure 1:
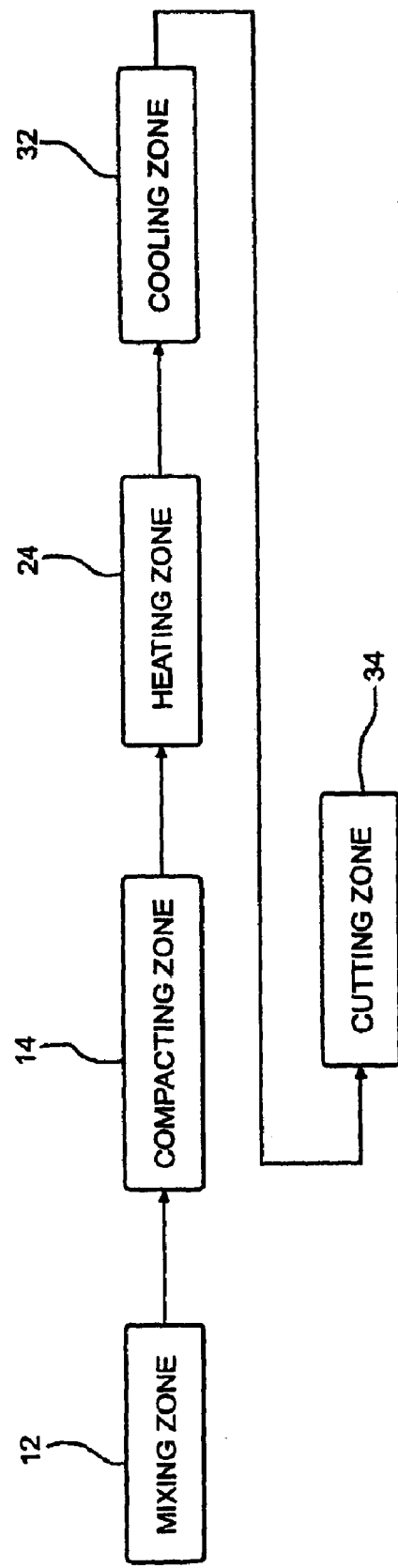
FIG. 1 shows a schematic diagram of a method for constructing a PTFE seal component according to a currently preferred embodiment of the invention.
Figure 3:
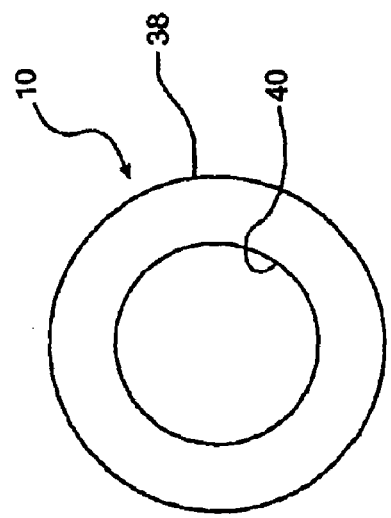
FIG. 3 shows a plan view of a PTFE seal component according to a currently preferred embodiment of the invention.

A PTFE seal component 10 is constructed utilizing methods that promote increased production rates at lower costs. The PTFE seal component 10 is comprised of a PTFE powder resin that is compacted with a susceptor material. The susceptor material facilitates the heating and sintering process, thereby promoting the ease in which the PTFE seal component 10 is constructed. Additionally, a continuous manufacturing process, from mixing the PTFE resin powder with the susceptor material to cutting the PTFE seal component 10, also facilitates an enhanced manufacturing process of the PTFE seal component 10.

The construction of the PTFE seal component 10 begins with creating a mixture of a PTFE resin powder with a susceptor material, preferably one that has lubricious characteristics such as graphite or the like. The lubricious PTFE characteristics of graphite facilitate an improved performance of the seal component by facilitating the reduction of friction between the seal component and a mating component (not shown). The creation of the mixture of PTFE resin powder and a susceptor material is shown here as occurring in a mixing zone 12. The mixing zone 12 mixes the PTFE resin powder and the susceptor material to preferably create a homogeneous mixture. It should be recognized that any mixing apparatus may be used to create the homogeneous mixture.

Following the mixing zone 12 is a compaction zone 14 for at least partially compacting the mixture. Initial stages of the compaction may occur in the mixing zone 12, but preferably the majority of the compaction occurs in the compaction zone 14. When the mixture is in the compaction zone 14, the mixture is in a "green" state. A blade member 16 rotates to compress the mixture of PTFE resin powder and susceptor material within a mold or tool 18 to take on a desired geometry to create a generally "green" billet of PTFE resin powder and susceptor material. Here, the desired geometry is generally tubular or cylindrical in shape, and is established by compacting the mixture between an outer cylindrical wall 20 and an inner mandrel 22 of the tool 18. It should be recognized that the shape need not be confined to a tubular geometry, and that any desired shape may be formed.

Upon compacting the mixture of the PTFE resin powder and susceptor material, the mixture is transferred to a heating zone 24, preferably in a continuous flow from the compaction zone 14 to reduce the amount of handling required throughout the manufacturing process. The heating zone 24 is shown here as a microwave-heating zone wherein microwaves excite the susceptor material to generate the heat required to sinter the mixture. Sintering the mixture causes the PTFE resin powder and susceptor material to cross-link, thus creating a resilient and dense polymerized billet of PTFE and susceptor material. It should be recognized that though microwaves are depicted here as the energizing source, other RF frequencies, or a magnetic field may be used to excite the susceptor material, and that the energizing source need not be limited to microwaves.

As the mixture enters the heating zone 24, preferably a preheating stage 26 is provided to preheat the mixture, while at the same time further compacting the mixture, to creating a more dense mixture. To further facilitate a more uniform and dense mixture, a vacuum 28 is preferably drawn on the mixture within the heating zone 24 to extract air from the mixture. The vacuum 28 is generated by any suitable connection of a vacuum line (not shown) through an outer perimeter 30 of the heating zone 24. The additional compaction and vacuum in the heating zone 24 promotes a more uniform sintered billet of PTFE and susceptor material by removing any porosity that may have resulted otherwise. This helps to create a more resilient PTFE seal component, and thus extends the useful life of the PTFE seal component 10 in use.

Upon being preheated, the mixture flows continuously within the heating zone 24 where the susceptor material is further excited by microwaves, thus generating more heat to facilitate heating and sintering of the mixture. The addition of the susceptor material makes an otherwise unmicrowavable PTFE resin powder microwavable. By microwaving the susceptor material within the PTFE resin powder, the sintering time required for the PTFE resin powder is substantially reduced, thus greatly increasing the production rates, while lowering the cost of producing the PTFE seal component 10. Not only is the time required to produce the PTFE seal component greatly reduced, but also the resources required to produce the seal component 10, such as labor, energy, space, and the like.

Upon being sintered in the heating zone 24, the mixture is preferably advanced continuously to a cooling zone 32. Cooling of the sintered billet culminates the curing process, and solidifies the cross-linking of the PTFE and susceptor material polymer. The billet, though substantially cooled in the cooling zone 32, preferably remains at least partially heated to promote finishing the construction of the PTFE seal component 10.

Upon exiting the cooling zone 32, the billet is preferably advanced continuously to a cutting zone 34. The cutting zone 34 is comprised of any suitable blade member 36 for cutting a wafer or PTFE seal component 10 to a desired thickness. Preferably, the mixture or billet remains at a partially heated temperature wherein the temperature is lower than the sintering temperature within the heating zone 24, but higher than the ambient temperature so that the cutting process for cutting the desired thickness of the PTFE seal component 10 is improved. Cutting an at least partially heated billet improves the quality and function of the PTFE seal component 10 by reducing or eliminating plastic deformation that may otherwise result in the cutting process. Therefore, cutting of the desired thickness of the PTFE seal component 10 from the advancing mixture is made easier by imparting a more precise shear of the billet material as the blade member traverses through the billet to cut the finished PTFE seal component.

The resulting PTFE seal component 10 is generally annular in shape having an outer perimeter 38 and an inner perimeter 40 for receiving a shaft (not shown). The seal component 10 is both resilient and lubricious so that the seal component is durable in use, while generating minimal friction between a rotatable shaft and/or housing.

Obviously, many modifications and variations of the present invention are possible in light of the above teachings it is, therefore, to be understood that within the scope of the appended claims, the invention may be practiced otherwise than as specifically described. The invention is defined by the claims.

What is claimed is:

1. A dynamic shaft seal component, comprising;
    a disc that is generally flat and annular in shape having an outer perimeter and an inner perimeter for receiving a shaft, said disc comprising a mixture of PTFE resin powder and a susceptor material, said susceptor material rendering said mixture sinterable using microwave energy so that said PTFE resin powder and said susceptor material are crosslinked to form said disc.
2. The dynamic shaft seal of claim 1 wherein said susceptor material is comprised of graphite.
3. The dynamic shaft seal of claim 1 wherein the mixture of PTFE resin powder and the susceptor material is a generally homogenous mixture.

* * * * *